(12) United States Patent
Elbaz et al.

(10) Patent No.: US 9,219,357 B1
(45) Date of Patent: Dec. 22, 2015

(54) KIT FOR COVERING OUTDOOR ELECTRICAL DEVICES

(71) Applicants: Michael Elbaz, New York, NY (US); Edna Elbaz, Neponsit, NY (US); Gil H. Elbaz, Belle Harbor, NY (US)

(72) Inventors: Michael Elbaz, New York, NY (US); Shimon Elbaz, Neponsit, NY (US); Gil H. Elbaz, Belle Harbor, NY (US)

(73) Assignee: SUPERFLEX, LTD., Brooklyn, NY (US)

( * ) Notice: Subject to any disclaimer, the term of this patent is extended or adjusted under 35 U.S.C. 154(b) by 0 days.

(21) Appl. No.: 14/466,171

(22) Filed: Aug. 22, 2014

(51) Int. Cl.
*H02G 3/14* (2006.01)
*H02G 3/08* (2006.01)
*H05K 5/02* (2006.01)

(52) U.S. Cl.
CPC .............. *H02G 3/081* (2013.01); *H02G 3/088* (2013.01); *H02G 3/14* (2013.01); *H05K 5/0226* (2013.01); *H05K 5/0239* (2013.01)

(58) Field of Classification Search
CPC ......... H02G 3/081; H02G 3/088; H02G 3/14; H05K 5/0239; H05K 5/0226
USPC ............................................. 174/66; 220/241
See application file for complete search history.

(56) References Cited

U.S. PATENT DOCUMENTS

| | | | |
|---|---|---|---|
| 5,763,831 A | 6/1998 | Shotey | |
| 6,133,531 A | 10/2000 | Hayduke | |
| 6,642,453 B2 | 11/2003 | Shotey | |
| 6,723,922 B1 | 4/2004 | Shotey | |
| 7,462,778 B1 | 12/2008 | Shotey | |
| 8,324,516 B1 * | 12/2012 | Gretz | 174/659 |
| 8,558,111 B1 * | 10/2013 | Baldwin et al. | 174/67 |
| 2009/0071681 A1 | 3/2009 | Junjie | |

* cited by examiner

*Primary Examiner* — Dhirubhai R Patel
(74) *Attorney, Agent, or Firm* — Seth Natter; Natter & Natter

(57) ABSTRACT

A kit for covering electrical devices includes a housing having a rear panel which receives adapter plates. An opening in an adapter plate is defined by a forwardly tapered chamfered wall. A frustum insert having a chamfered wall opening may be received in the adapter plate opening and successive frustum inserts, each having a smaller chamfered wall opening, may be inserted within the opening of the prior insert. Each of the openings is dimensioned to receive the face of a different electrical device. A frustum plug having a rectangular toggle switch opening can be received in one of the chamfered openings. The top and side of the housing include arrays of hinge pins and a lid includes mating arrays of hinge knuckles. The lid is mounted to either array of pins. Selected pins have enlarged heads to prevent inadvertent disengagement.

20 Claims, 9 Drawing Sheets

KIT FOR COVERING OUTDOOR ELECTRICAL DEVICES

BACKGROUND OF THE INVENTION

1. Field of the Invention

This invention relates generally to outdoor electrical device covers and more particularly to a kit having components which are adaptable for covering a variety of different electrical devices.

2. Antecedents of the Invention

There exists a wide variety of electrical devices mounted within boxes of electrical systems, e.g., receptacles of different voltage and current capacities, toggle switches, paddle switches, GFCI units, etc., having different sizes and shapes which necessitate device covers dimensioned to accommodate the face of each specific device. Covers for devices exposed to weather also required a weatherproof lid and, in some instances, a locking mechanism. Because each different size and shape of device required a different type of cover configured for it, an electrician was required to carry several types of covers to the job site.

Attempts have been made at providing an adaptable cover which could be configured to fit commonly encountered devices. To this end, a partial solution to the problem proposed a cover having removable tabs which when broken off, varied the shape of an aperture which received the face of the device, depending on which tabs were broken off.

Problems associated with this approach included difficulty in selecting and breaking the tabs as well as the possibility of irreversibly creating an aperture too large for the device being covered. Additionally, the remaining structure, which included unbroken tabs, was inherently weak and susceptible to breakage when the components were tightened during installation or due to residual stress after installation.

SUMMARY OF THE INVENTION

A kit for covering electrical devices includes a housing having a rear panel as well as top, side and bottom panels. An orifice of the rear panel is dimensioned to accommodate adapter plates. An opening in an adapter plate is configured to receive at least one of a plurality of inserts for accommodating a specific device.

The adapter plate opening is defined by a forwardly tapered chamfered wall. A frustum insert, having a matingly tapered external surface and a chamfered wall opening, may be seated in the adapter plate opening. Successive frustum inserts, each having a smaller chamfered wall opening, may be nested within the opening of the previously seated insert. Each of the openings is dimensioned to receive the face of a different electrical device and/or to receive the next successive insert. A frustum plug having a rectangular toggle switch opening may be seated in one of the frustum insert openings.

The top and one side of the housing include integral arrays of hinge pins and the top and one side of a lid includes mating arrays of hinge knuckles. The lid is mounted to either array of pins. One or more pins of each array is longer than its respective knuckle, is slotted and has an enlarged head to prevent inadvertent hinge separation.

From the foregoing compendium, it will be appreciated that an aspect of the present invention is to provide a kit for covering outdoor electrical devices which is not subject to the foregoing disadvantages of the antecedents of the invention.

A feature of the present invention is to provide a kit for covering outdoor electrical devices which is simple to assemble and easy to use.

A consideration of the present invention is to provide a kit for covering outdoor electrical devices which is well suited for heavy duty applications.

A further aspect of the present invention is to provide a kit for covering outdoor electrical devices which is well suited for economical mass production fabrication.

A still further consideration of the present invention is to provide a kit for covering outdoor electrical devices capable of withstanding stress encountered during assembly and mounting to an electrical box as well as residual stress.

Another feature of the present invention is to provide a kit for covering outdoor electrical devices wherein an adapter plate includes a chamfered wall opening which accommodates a frustum insert having an opening dimensioned to accommodate a specific electrical device.

An additional consideration of the present invention is to provide a kit for covering outdoor electrical devices wherein an adapter plate includes a chamfered wall opening which accommodates a frustum insert having an opening dimensioned to accommodate a further frustum insert.

To provide a kit for covering outdoor electrical devices wherein an adapter plate includes a chamfered wall opening which accommodates a frustum insert and mounting of a specific frustum insert is not irreversible is a further consideration of the present invention.

Another aspect of the present invention is to provide a kit for covering outdoor electrical devices wherein adapter plate inserts are secured in position through mating chamfered surface engagement for strength and durability.

A further feature of the present invention is to provide a kit for covering outdoor electrical devices which includes a hinged connection between a lid and a housing wherein a slotted hinge pin having an engaged head is seated in a hinge knuckle.

A still further consideration of the present invention is to provide a kit for covering outdoor electrical devices wherein all components can be economically molded of weatherproof thermoplastic resins.

BRIEF DESCRIPTION OF THE DRAWINGS

In the accompanying drawings, wherein some of the various possible exemplary embodiments of the invention are shown.

DESCRIPTION OF THE PREFERRED EMBODIMENTS

Figure 1:
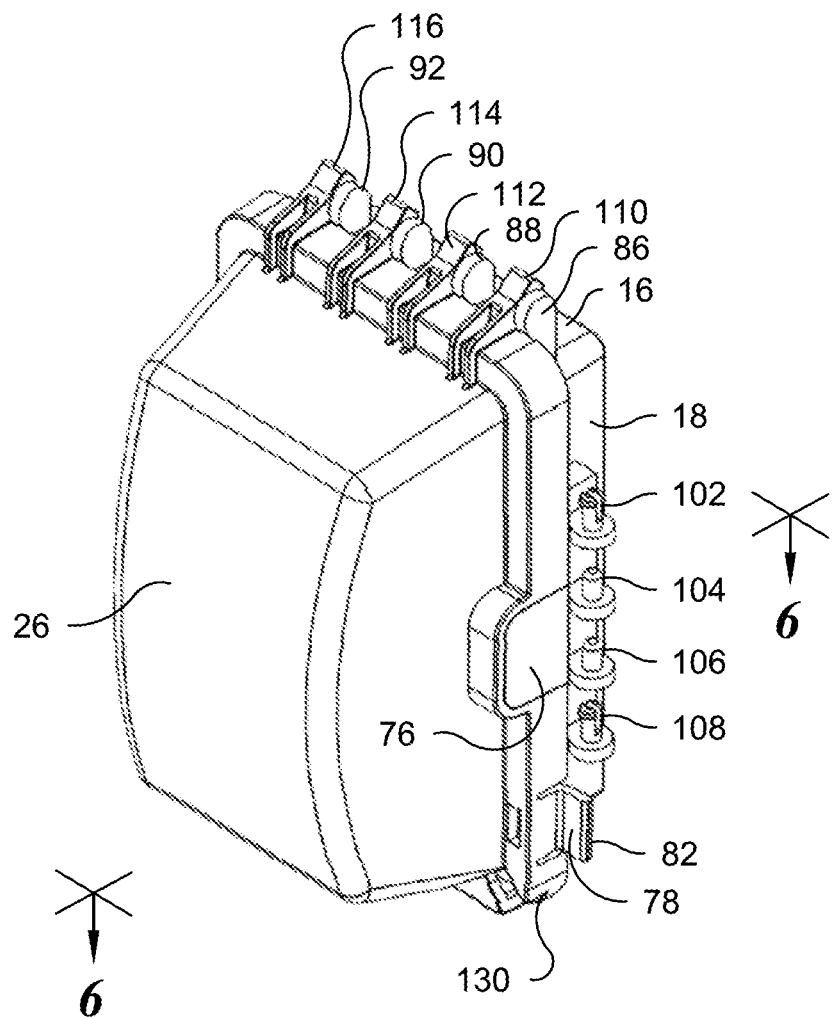
FIG. 1 is an isometric view of an electrical device cover fabricated from a kit constructed in accordance with and embodying the present invention.

Referring now in detail to the drawings a kit 10 for covering electrical devices in accordance with the invention includes a substantially rectangular housing 12 includes a rear panel 14, a top panel 16, a right side panel 18, a left side panel 20 and a bottom panel 22. A peripheral flange 24 surrounds the proximal edges of the panels 16, 18, 20 and 22.

Figure 9:
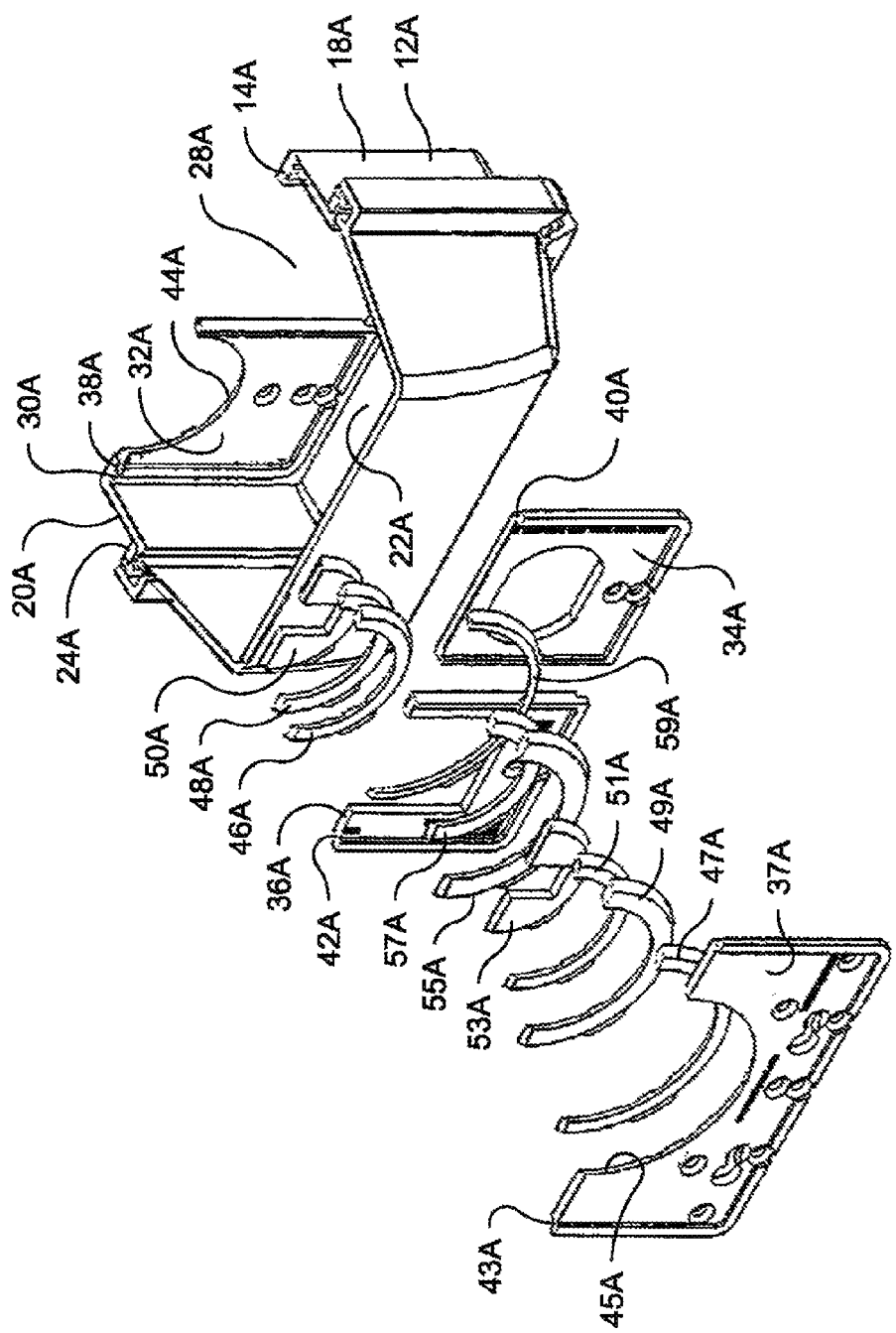
FIG. 9 is a sectional view, taken substantially along the plane 9-9 of FIG. 8.

A weatherproof lid 26 may be hinged to either the top panel 16 or the right side panel 18 is generally illustrated as being hinged to the top panel 16, except in FIG. 9, wherein it is shown hinged to the right side panel 18.

Figure 2:
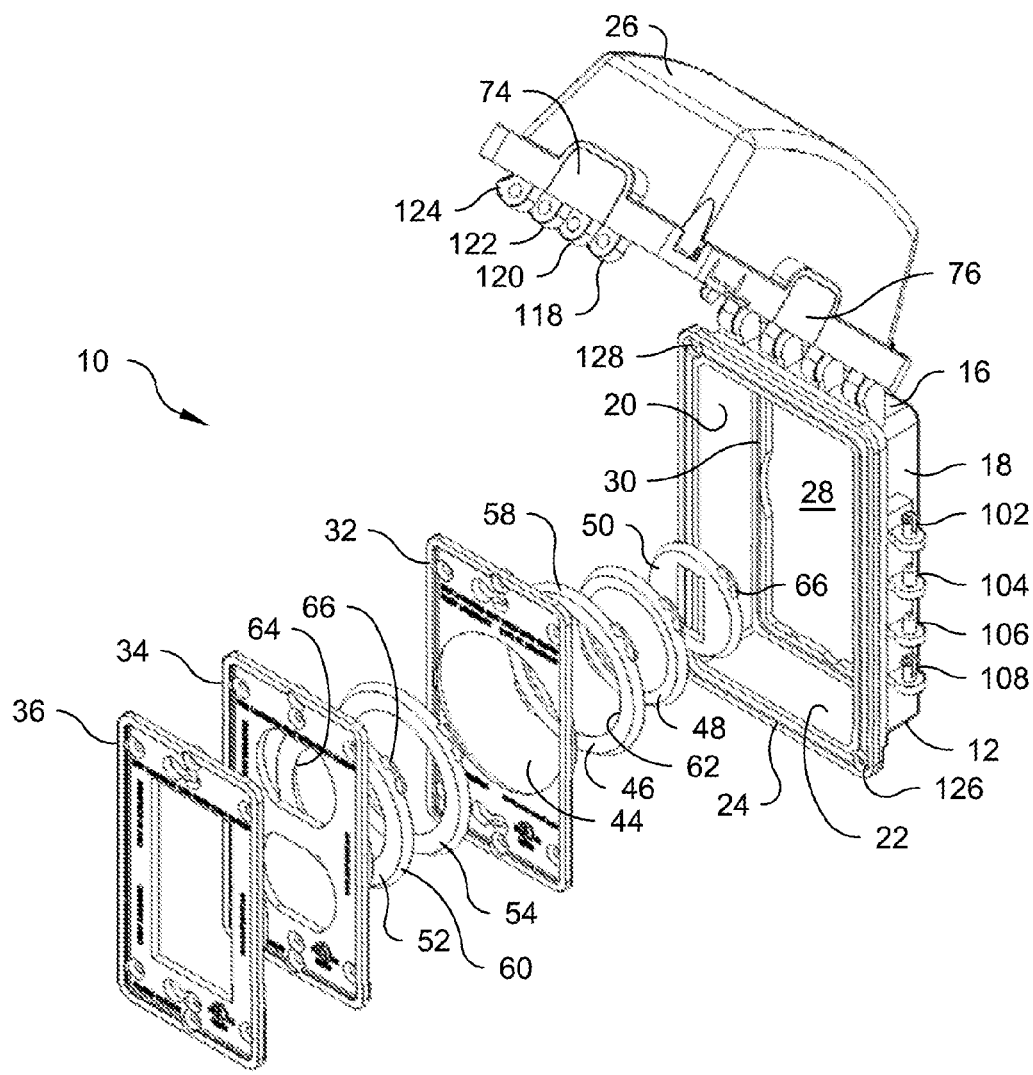
FIG. 2 a front isometric view, similar to FIG. 1, however with a cover lid in open position and showing, in exploded format, various adapter plates and inserts of the kit.
Figure 3:
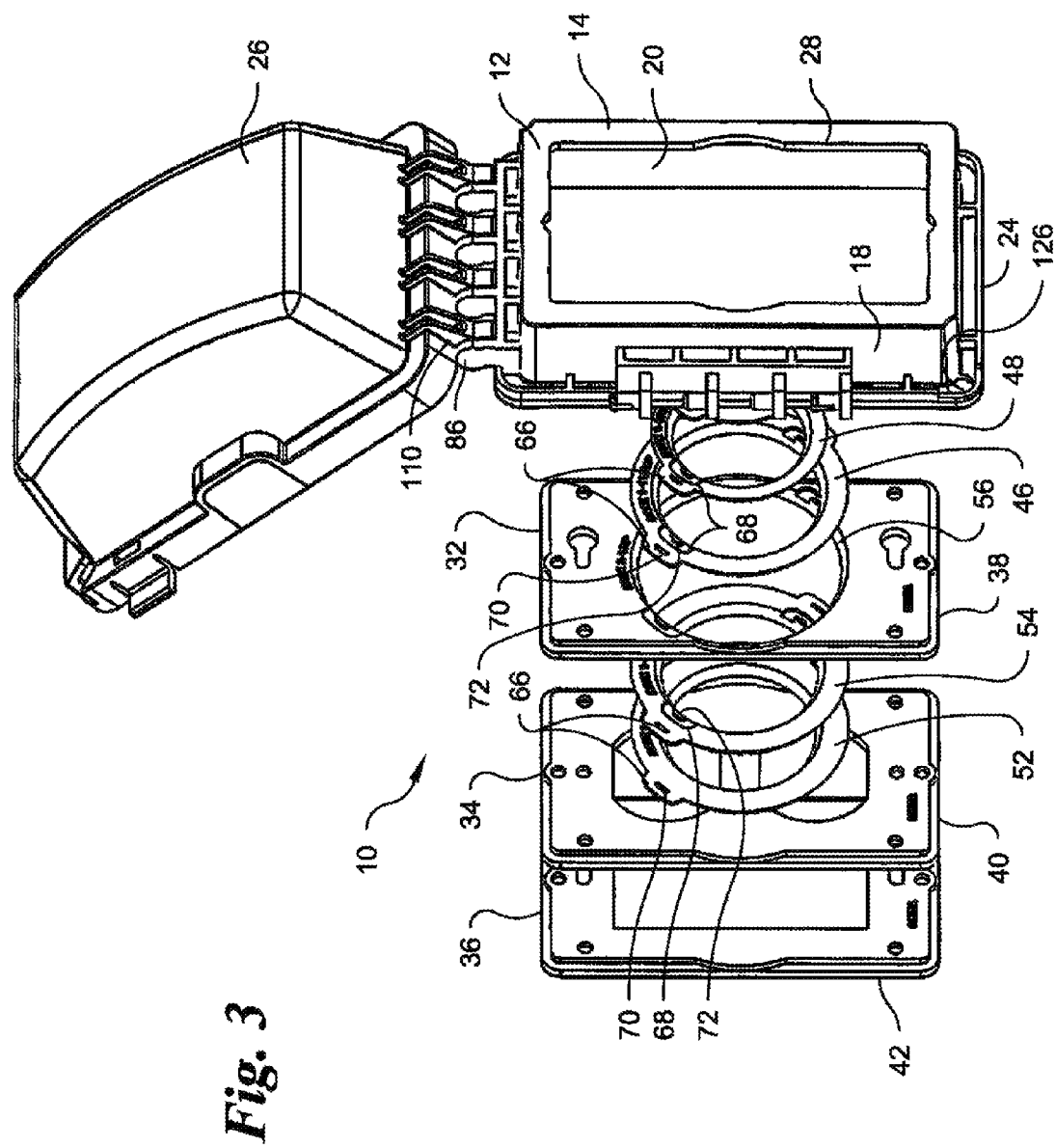
FIG. 3 is a rear elevational exploded view of the kit.
Figure 4:
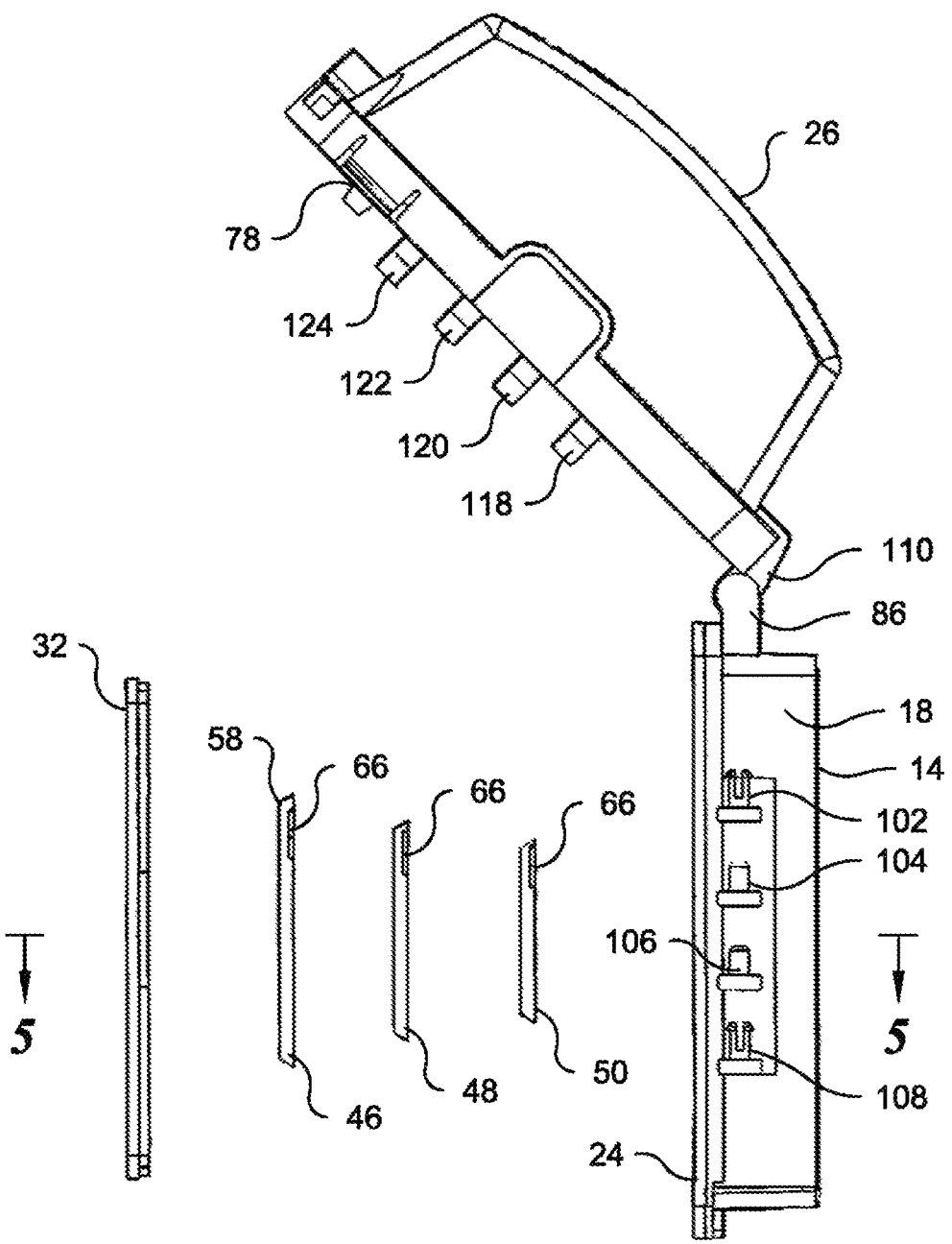
FIG. 4 is a side elevational exploded view of some of the kit components illustrated in FIG. 3.
Figure 5:
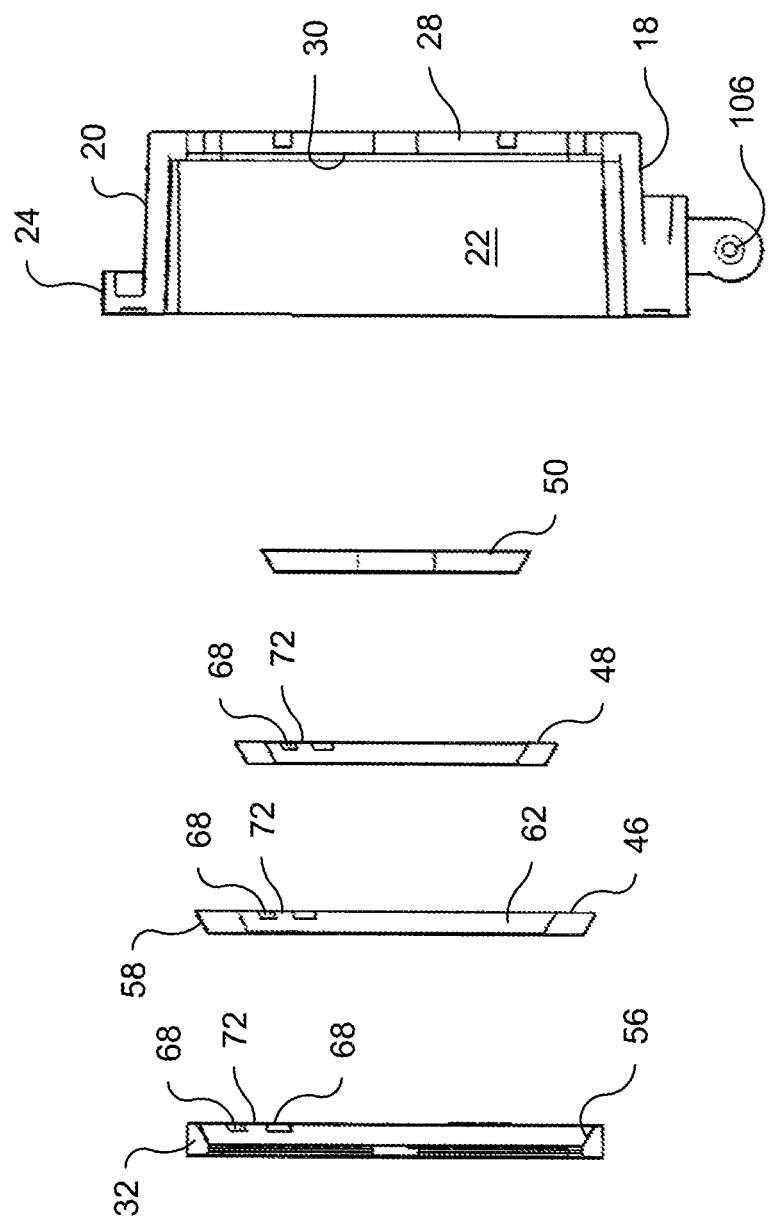
FIG. 5 is a sectional view taken along the plane 5-5 of FIG. 4.

With attention directed to FIGS. 2 and 3, it should be noted that the rear panel 14 includes an orifice 28 of generally rectangular shape surrounded by a peripheral recess 30 formed on the inner or front face of the rear panel 14.

The kit 10 includes a plurality of adapter plates 32, 34 and 36, each of which is configured to be received within the orifice 28. From an examination of FIG. 3, it will be noted that each of the adapter plates includes a peripheral flange of reduced thickness 38, 40, 42 which is dimensioned to seat in the peripheral recess 30.

The adapter plates 34, 36 include openings configured to cover and permit access to the face of a duplex receptacle and devices having rectangular faces including GFCI receptacles respectively. A variety of mounting holes extend through each adapter plate, with the mounting holes configured to receive selected fasteners, e.g., mounting screws, which engage apertures in an electrical box for securing the entire cover comprising the assembled kit 10 to the electrical box carrying the electrical device to be covered.

Pursuant to the invention, the adapter plate 32 includes an opening 44 configured to receive on its rear face at least one of a plurality of inserts 46, 48, 50, 52, 54 for effecting a change in the dimensions of the opening such that the opening size selected will accommodate the face of an electrical device being installed. It should be noted that for convenience of illustration only, FIGS. 2 and 3 illustrate the inserts 52 and 54 in front of the adapter plate 32, whereas if selected, they are to be inserted at the rear face of the adapter plate 32.

The adapter plate opening 44 is defined by a forwardly tapered chamfered wall 56, such that the opening 44 is larger at the rear face of the adapter plate than at the front face. A frustum insert 46 or 52, having a matingly tapered external surface 58, 60 and a chamfered wall opening may be seated in the adapter plate opening 44. Successive frustum inserts 48, 54, each having a smaller chamfered wall opening, may be nested within a rear face the opening 62, 64 of the previously seated insert (46, 52, respectively). The opening in the adapter plate 32 and the openings of the frustum inserts 46, 48, 50, 52, 54 are dimensioned to receive the face of a different electrical device. The frustum insert 50 comprises a plug having a rectangular toggle switch opening and may be seated the opening of the frustum insert 48.

While the frustum inserts, 46, 48, 52, and 54, by way of example only, comprise frustoconical rings, it should be appreciated that pyramidical or oval frustum inserts could be employed with noncircular and/or circular openings configured to accept the faces of electrical devices having corresponding shapes and/or other successively smaller frustum inserts.

Each of the frustum inserts includes a pair of radially extending diametrically opposed registration tabs 66 configured for placement within in correspondingly dimensioned recessed seats 68 formed in the rear face of the adapter plate 32, as well as the rear faces of the frustum inserts 46, 48, 52 and 54. There is also provided a notch 70 in each tab 66 and a post 72, projecting from each seat fits within the notch to secure the frustum insert against rotation or dislodgement from its opening within which it is received prior to complete assembly of the cover.

It should be appreciated that when the adapter plate 32 is fitted with one or more frustum inserts, engagement between the forwardly tapered chamfered walls and the tapered external surfaces of the frustum inserts maximizes abutting surface area contact, thus assuring that the frustum inserts will not be dislodged, i.e., pushed through the adapter plate opening 44 or the openings in the previously inserted frustum inserts, when the fasteners are tightened or possibly over tightened during installation and possibly after installation as a result of residual stress.

Figure 6:
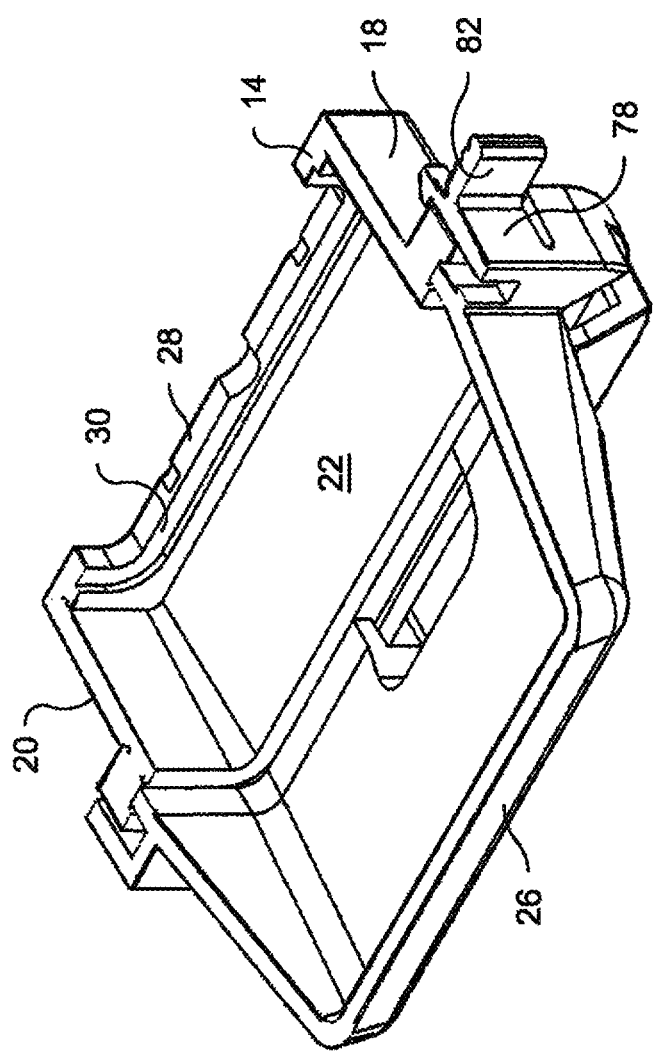
FIG. 6 is an enlarged scale sectional view taken along the plane 6-6 of FIG. 1, with components deleted for clarity and showing a latch mechanism for securing the lid in a closed position.
Figure 7:
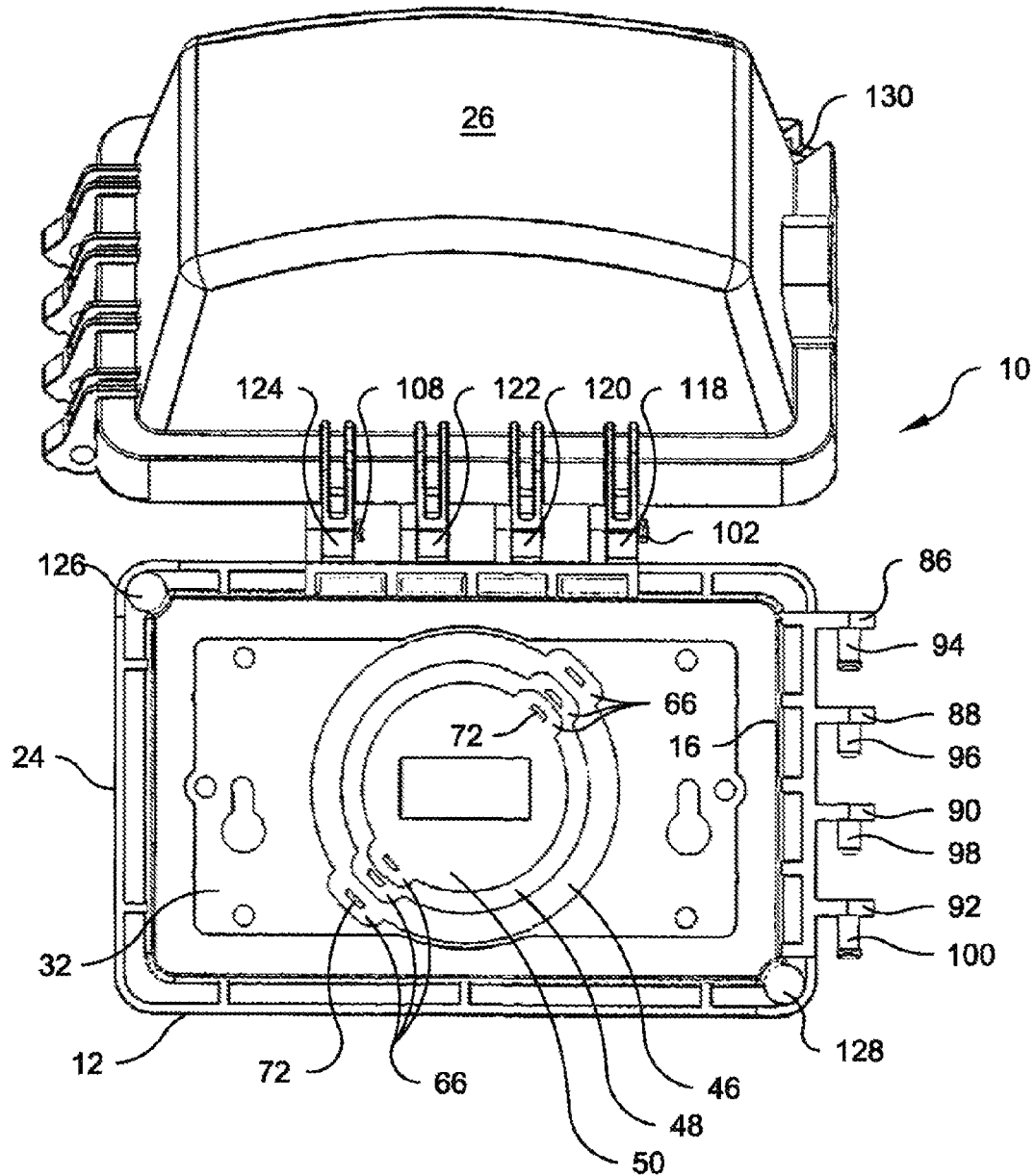
FIG. 7 is an enlarged scale rear elevation view, with the lid opened and hinged to a side panel of the housing and showing a toggle switch cover configuration utilizing an adapter panel and three inserts.

When configured in the orientation of FIGS. 1-6, an integral electric cord knock out panel 74 at the bottom of the lid 26 is removed to provide an in use passageway, illustrated in FIG. 6, while when the lid is hinged about the right side edge, with the hinge being horizontally oriented at the top of the electrical box, as illustrated in FIG. 7, a knock out panel 76 is removed.

The lid 26 is maintained in a closed position by an integral latch 78, best illustrated in FIG. 6, having a flange 80 which engages a keeper surface on the rear face of the housing peripheral flange 24. To release the latch 78 and open the lid, a grip 82 is pulled forwardly.

Both the top and right side of the housing 12 include integral arrays of hinge pins and the top and left side panels of the lid 26 include mating arrays of hinge knuckles. The lid 26 is mounted to either array of pins, depending upon the orientation of the electrical box housing the device such that the lid 26 is hinged in a generally horizontal plane adjacent the top of the electrical box. One or more pins of each array is longer than its respective knuckle, is slotted and has a mushroomed head to prevent inadvertent hinge separation.

As shown in FIG. 7, wherein the hinge pins associated with the top panel 16 are illustrated, a platform 84 which is integral with the housing 12 includes a plurality of pin flanges 86, 88, 90 and 92. Each of the pin flanges includes an integral pin 94, 96, 98 and 100, all of which are coaxial. One or more hinge pins 94, 100, are longer than the remaining pins, include mushroomed heads and are axially slotted to enable compression of the mushroomed heads. An identical array of hinge pins 102, 104, 106, and 108 are formed on the right side panel 18, with the slots being best illustrated in FIG. 4.

An array of hinge knuckles 110, 112, 114 and 116, which are configured to mate with the top panel hinge pin arm, is formed integral with the peripheral flange of the lid 26 while an array of hinge knuckles 118, 120, 122 and 124, configured to mate with the right side panel hinge pin array, is also formed integral with the peripheral flange of the lid 26. The lid 26 is mounted to the housing 12 by registering the bores of a selected knuckle array with the hinge pins of the selected hinge pin array and sliding the knuckles over the hinge pins, compressing the mushroom heads. When the knuckles are fully seated over the pins and the knuckles abut their respective hinge flanges, the mushroom heads extend beyond their knuckles and expand to prevent inadvertent disengagement.

It should be noted that a pair of apertures 126, 128 are formed through opposed diagonal corners of the housing peripheral flange. When the lid is closed, one of the apertures 126, 128 will be in registration with an aperture 130 formed in a corner of the lid peripheral flange so as to permit the lid to be locked by way of a padlock, wire seal, etc.

Figure 8:
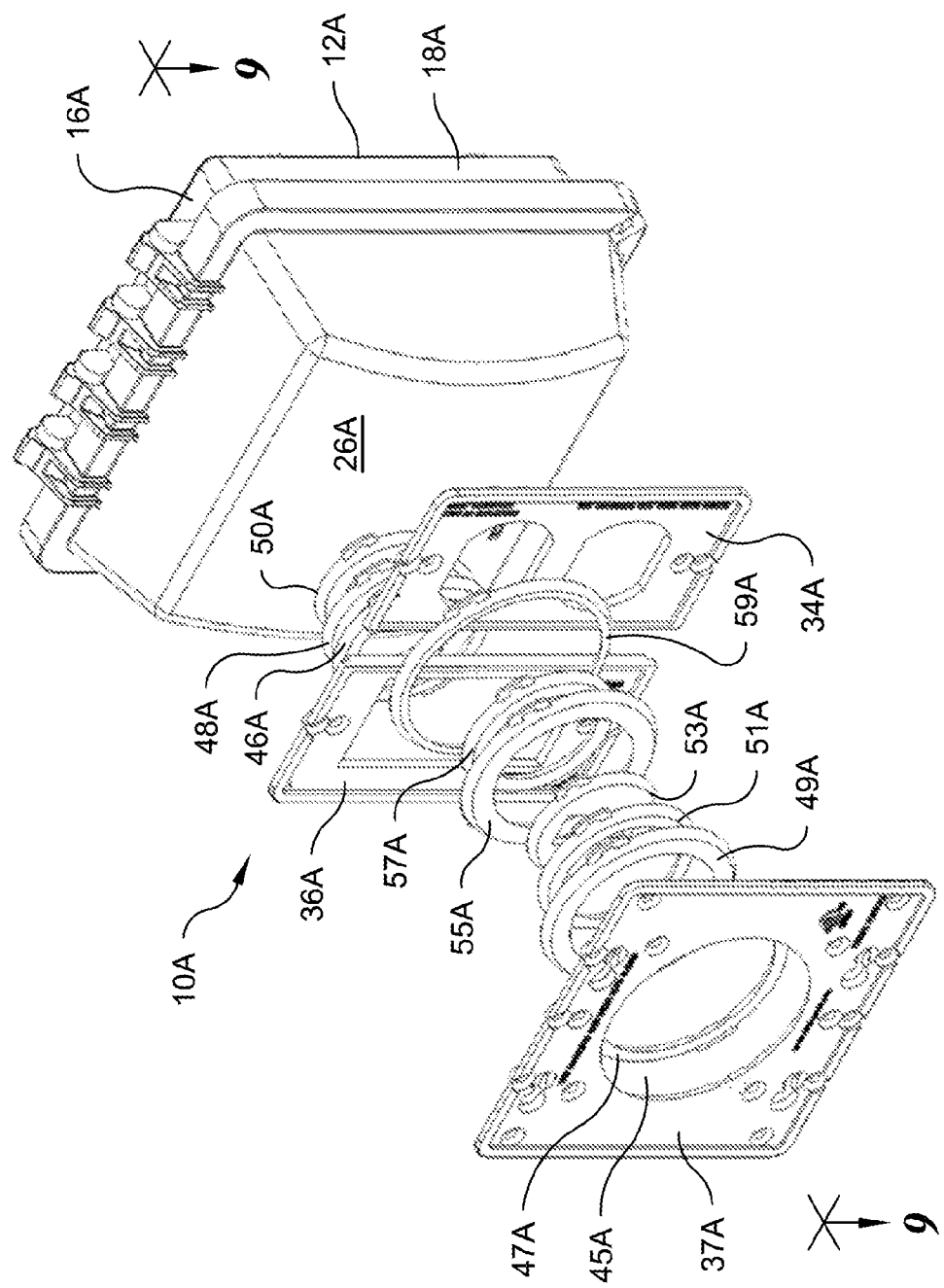
FIG. 8 is an exploded isometric view of an alternate embodiment of the invention, with the lid closed.

Referring now to FIGS. 8 and 9, wherein an alternate embodiment of the invention is shown, like numerals will be employed to denote like components of the previous embodiment, however bearing the suffix "A". A kit 10A for covering electrical devices carried within square electrical boxes, such as two devices in side by side orientation, includes a substantially square housing 12A having a rear panel 14A, a top panel 16A, a right side panel 18A, a left side panel 20A and a bottom panel 22A. A peripheral flange 24A surrounds the proximal edges of the panels 16A, 18A, 20A and 22A. A weatherproof lid 26A is hinged to the top panel 16A.

The rear panel 14A includes an orifice 28A of generally square shape surrounded by a peripheral recess 30A formed on the inner or front face of the rear panel 14A. The kit 10A also includes plurality of rectangular adapter plates 32A, 34A and 36A, each of which is dimensioned to be received within the orifice 28A in side by side abutting relationship with another of the adapter plates 32A, 34A or 36A. From an examination of FIG. 9, it will be noted that each of the adapter plates includes a flange of reduced thickness 38A, 40A, 42A which extends along the top, bottom and one side of the respective adapter plate 38A, 40A, 42A. The flanges are dimensioned to seat the top, bottom and one side of two of the adapter plates in the peripheral recess 30A.

The adapter plates 34A, 36A include openings configured to cover and permit access to the face of a duplex receptacle and devices having rectangular faces including a GFCI receptacle respectively. A variety of mounting holes extend through each adapter plate, with the mounting holes configured to receive selected mounting screws for securing the entire cover comprising the assembled kit 10A to an electrical box carrying the electrical device to be covered.

Pursuant to the invention, the adapter plate 32A includes an opening 44A configured to receive on its rear face at least one of a plurality of frustum inserts 46A, 48A, 50A for effecting a change in the dimensions of the opening such that the changed opening size selected will accommodate the face of one of the electrical devices being installed. It should be noted that for convenience of illustration only, FIGS. 8 and 9 illustrate the frustum inserts 46A, 48A, 50A in front of the lid 24A, whereas in use and if selected, they are to be inserted at the rear face of the adapter plate 32A. In all other aspects, structure and engagement between the frustum inserts 46A, 48A, 50A and the adapter plate 32A is identical to that heretofore described in detail with respect to the corresponding components of the previous embodiment.

As previously mentioned, the rear panel orifice 28A is of square configuration. The kit 10A includes an alternate adapter plate 37A of square configuration and dimensioned to be received within and completely occupy the orifice 28A. A peripheral flange of reduced thickness 43A surrounds the adapter plate 37A. The flange 43A is dimensioned to seat in the peripheral recess 30A when the adapter plate 37A is positioned in the orifice 28A.

The adapter plate 37A includes a large opening 45A configured to accept the face of a single large device centrally mounted in a square electrical box. As with the adapter plates 32 and 32A, the opening 45A in the adapter plate 37A is also configured to receive, on its rear face, at least one of a plurality of frustum inserts 47A, 49A, 51A, 53A, 55A, 57A and 59A for effecting a change in the dimensions of the opening, such that the changed opening size will accommodate the face of an electrical device which is centrally positioned in the electrical box.

With the exception of the dimensions of their respective tapered external surfaces and chamfered wall openings, the frustum inserts 46A, 48A, 47A, 49A, 51A, 55A, 57A and 59A are substantially identical to the frustum inserts 46, 48, 52, 54 of the previous embodiment and the frustum inserts 50A and 53A are substantially identical to the frustum insert 50 of the previous embodiment.

The lid 26A includes a single array of hinge knuckles which are configured to mate with an array of hinge pins formed integral with the top panel 16A of the housing 12A, in a manner identical to that of the previous embodiment.

It should be appreciated that all of the components of the kit 10 can be economically mass produced as by molding from a suitable thermoplastic, such as, polycarbonate, polystyrene, polyamide, ABS, etc.

Thus is will be seen that there is provided a kit for covering outdoor electrical devices which achieves the various aspects, features and considerations of the present invention and which is well suited to meet the conditions of practical usage.

As various possible further embodiments might be made of the present invention and various changes might be made in the illustrative embodiments above set forth without departing from the spirit of the in invention, it is to be understood that all matter herein described or shown in the accompanying drawings is to be interpreted as illustrative and not in a limited sense.

Having thus described the invention, there is claimed as new and desired to be secured by Letters Patent:

1. A kit for covering electrical devices, the kit comprising a housing having a rear panel, the rear panel including an orifice, a lid configured to be hinged to the housing, a first adapter plate dimensioned to be received within the orifice, the first adapter plate having a front face, a rear face and an opening, the opening being defined by a first forwardly tapered wall and being larger at the rear face, a frustum insert dimensioned to be seated in the opening, the frustum insert having an opening dimensioned to accommodate the face of an electrical device.

2. A kit for covering electrical devices in accordance with claim 1, wherein the frustum insert is frustoconical.

3. A kit for covering electrical devices in accordance with claim 1, including a second adapter plate having an opening, the opening in the second adapter plate being dimensioned to accommodate a face of a different electrical device.

4. A kit for covering electrical devices in accordance with claim 3 wherein the different electrical device comprises a ground fault circuit interruptor [GFCI] receptacle or a duplex receptacle.

5. A kit for covering electrical devices in accordance with claim 1, the kit including a plurality of further adapter plates, each further adapter plate being configured with an opening of a different size.

6. A kit for covering electrical devices in accordance with claim 1 wherein the frustum insert includes at least one registration tab projecting therefrom and the rear face of the first adapter plate includes a seat dimensioned to receive said at least one registration tab.

7. A kit for covering electrical devices in accordance with claim 1 wherein the rear panel orifice is dimensioned to accommodate two adapter plates positioned side by side, the kit including a third adapter plate dimensioned to occupy the rear panel orifice.

8. A kit for covering electrical devices in accordance with claim 1, wherein the frustum insert is seated in the opening of the first adapter plate and the opening in the frustum insert is defined by a second forwardly tapered wall, the kit further including a plurality of frustum inserts, each of said inserts having an opening defined by another forwardly tapered wall and being configured to be nestably received in the opening of the seated frustum insert.

9. A kit for covering electrical devices in accordance with claim 8, wherein each of said the frustum inserts is frustoconical.

10. A kit for covering electrical devices in accordance with claim 8 wherein each frustum insert includes a registration tab projecting therefrom and the rear faces of the frustum inserts include a seat dimensioned to receive the registration tab.

11. A kit for covering electrical devices in accordance with claim 1, wherein the frustum insert comprises a plug having an opening configured to accommodate the face a toggle switch.

12. A kit for covering electrical devices in accordance with claim 1, further including a hinge configured to pivotally interconnect the housing and the lid, the hinge including a hinge pin and a hinge knuckle, the pin having a mushroom head at its distal end, the pin having an axial length greater than an axial length of the knuckle such that when the pin is seated in the knuckle, the mushroom head extends beyond the knuckle, the pin having an axial slot extending at least through the mushroom head, whereby the mushroom head may be compressed to permit the pin to seat within the knuckle.

13. A kit for covering electrical devices in accordance with claim 1 wherein the electrical device comprises a first electrical device, the kit including a second adapter plate, the second adapter plate having an opening dimensioned to accommodate a second electrical device comprising a receptacle.

14. An adaptable cover for outdoor electrical devices carried within an electrical box, the cover comprising a housing, a lid hinged to the housing, the housing including a rear panel having an orifice, an adapter plate received within the orifice, the adapter plate having a front face, a rear face and an opening, the opening being defined by a forwardly tapered wall and a first frustum insert seated in the opening of the adapter plate, the first frustum insert having an opening dimensioned to accommodate a second frustum insert.

15. An adaptable cover for outdoor electrical devices carried within the electrical box in accordance with claim 14, wherein said second frustum insert is seated within the opening of the first frustum insert, further including a plurality of additional frustum inserts, each nested within an opening of a seated frustum insert.

16. An adaptable cover for outdoor electrical devices carried within the electrical box in accordance with claim 14 wherein the openings of the frustum inserts are each dimensioned to accommodate the face of a different electrical device.

17. An adaptable cover for outdoor electrical devices carried within the electrical box in accordance with claim 14 wherein the frustum inserts are frustoconical.

18. An adaptable cover for outdoor electrical devices carried within the electrical box in accordance with claim 14 wherein the lid is hinged to the housing through a hinge including a hinge pin and a hinge knuckle, the pin having a mushroom head at its distal end, the pin having an axial length greater than an axial length of the knuckle such that when the pin is seated in the knuckle, the mushroom head extends beyond the knuckle, the pin having an axial slot extending at least through the mushroom head, whereby the mushroom head may be compressed to permit the pin to seat within the knuckle.

19. An adaptable cover for outdoor electrical devices carried within an electrical box in accordance with claim 14, wherein said second frustum insert is seated in the opening of the first frustum insert, the cover further including a third frustum insert, the second frustum insert having an opening dimensioned to accommodate the third frustum insert, the third frustum insert being seated in the opening of the second frustum insert.

20. An adaptable cover for outdoor electrical devices carried within an electrical box in accordance with claim 14 including an additional adapter plate, said additional adapter plate being configured with an opening dimensioned to accommodate a face of an electrical device.

* * * * *